(12) United States Patent
Chan

(10) Patent No.: US 6,950,893 B2
(45) Date of Patent: Sep. 27, 2005

(54) HYBRID SWITCHING ARCHITECTURE

(75) Inventor: Johni Chan, Rancho Santa Fe, CA (US)

(73) Assignee: I-Bus Corporation, Santa Clara, CA (US)

( * ) Notice: Subject to any disclaimer, the term of this patent is extended or adjusted under 35 U.S.C. 154(b) by 476 days.

(21) Appl. No.: 09/815,772

(22) Filed: Mar. 22, 2001

(65) Prior Publication Data

US 2004/0225785 A1 Nov. 11, 2004

(51) Int. Cl.$^7$ .................. G06F 12/00; G06F 13/14; G06F 13/38

(52) U.S. Cl. .............. 710/240; 710/316; 710/317; 712/21; 714/2; 714/6; 714/11; 714/43

(58) Field of Search .............. 710/316, 317, 710/240; 712/21; 714/2, 6, 11, 43, 1; 370/216; 709/200; 326/10; 379/112.02; 327/526

(56) References Cited

U.S. PATENT DOCUMENTS

| | | | | |
|---|---|---|---|---|
| 4,014,005 A | * | 3/1977 | Fox et al. .................... | 710/317 |
| 4,173,713 A | * | 11/1979 | Giesken et al. ............. | 370/374 |
| 4,438,494 A | * | 3/1984 | Budde et al. .................. | 714/2 |
| 4,811,210 A | * | 3/1989 | McAulay ..................... | 710/317 |
| 4,968,977 A | * | 11/1990 | Chinnaswamy et al. ... | 340/2.24 |
| 5,056,000 A | * | 10/1991 | Chang ........................ | 710/110 |
| 5,093,826 A | * | 3/1992 | Leichum ..................... | 370/381 |
| 5,185,693 A | | 2/1993 | Loftis et al. | |
| 5,285,381 A | * | 2/1994 | Iskarous et al. .............. | 700/82 |
| 5,396,602 A | | 3/1995 | Amini et al. | |

(Continued)

FOREIGN PATENT DOCUMENTS

| | | | | |
|---|---|---|---|---|
| DE | 3334796 A | * 11/1984 | ............. | G06F/9/46 |
| EP | 515989 A2 | * 12/1992 | ........... | H04L/12/56 |
| EP | 0 629 956 A2 | 12/1994 | | |
| EP | 0 820 018 A2 | 1/1998 | | |
| EP | 1 041 492 A2 | 10/2000 | | |
| WO | WO 96/10792 | 4/1996 | | |
| WO | WO 96/13775 | 5/1996 | | |
| WO | WO 98/44417 | 10/1998 | | |
| WO | WO 99/21087 | 4/1999 | | |
| WO | WO 99/57632 | 11/1999 | | |
| WO | WO 00/13074 | 3/2000 | | |
| WO | WO 00/41083 | 7/2000 | | |

OTHER PUBLICATIONS

Wang, K, et al., "Design and Implementation of Fault–Tolerant and Cost–Effective Crossbar Switches for Multiprocessor Systems", Jan. 1999, Computers and Digital Techniques, IEEE Proceedings, vol. 146, Issue 1, p. 50–56.*
Stiliadis, D., et al., "Providing Bandwidth Guarantees in an Input–Buffered Crossbar Switch", INFOCOM '95, 14th Annual Joint Conference of the IEEE Computer & Communications Societies, Bringing Information to People, Apr. 2–6, 1995, vol. 3, p. 960–968.*
Naik, R., et al., "Large Integrated Crossbar Switch", Wafer Scale Integration, 1995. Proceedings, Seventh Annual IEEE International Conference on, Jan. 18–20, 1995, p. 217–227.*
U.S. Appl. No. 10/065,185, filed Sep. 24, 2002, Johni Chan.

*Primary Examiner*—Mark H. Rinehart
*Assistant Examiner*—Donna K. Mason
(74) *Attorney, Agent, or Firm*—Thomas F. Lebens; Fitch, Even, Tabin & Flannery (57) ABSTRACT

A hybrid switching module includes a hybrid switching module processor data channel; a hybrid switching module main data channel; an input/output link data channel; a switch coupled to the hybrid switching module processor data channel; and a bridge coupled to the hybrid switching module main data channel; wherein the switch selectively coupled to the bridge and selectively coupled to the input/output link data channel, wherein the hybrid switching module processor data channel is thereby selectively coupled to the bridge and selectively coupled to the input/output link data channel.

16 Claims, 5 Drawing Sheets

BACKPLANE CONNECTIONS

U.S. PATENT DOCUMENTS

| | | | |
|---|---|---|---|
| 5,434,998 A | 7/1995 | Akai et al. | |
| 5,448,703 A | 9/1995 | Amini et al. | |
| 5,450,551 A | 9/1995 | Amini et al. | |
| 5,499,346 A | 3/1996 | Amini et al. | |
| 5,530,946 A | 6/1996 | Bouvier et al. | |
| 5,557,758 A | 9/1996 | Bland et al. | |
| 5,561,820 A | 10/1996 | Bland et al. | |
| 5,572,688 A | 11/1996 | Sytwu | |
| 5,574,950 A * | 11/1996 | Hathorn et al. | 710/8 |
| 5,583,987 A | 12/1996 | Kobayashi et al. | |
| 5,621,902 A | 4/1997 | Cases et al. | |
| 5,706,478 A | 1/1998 | Dye | |
| 5,729,675 A | 3/1998 | Miller et al. | |
| 5,740,385 A | 4/1998 | Hayek et al. | |
| 5,774,680 A | 6/1998 | Wanner et al. | |
| 5,781,748 A | 7/1998 | Santos et al. | |
| 5,873,000 A | 2/1999 | Lin et al. | |
| 5,875,310 A | 2/1999 | Buckland et al. | |
| 5,878,235 A | 3/1999 | Porterfield et al. | |
| 5,892,931 A | 4/1999 | Cohen et al. | |
| 5,894,563 A | 4/1999 | Saperstein | |
| 5,911,084 A | 6/1999 | Jones et al. | |
| 5,922,057 A | 7/1999 | Holt | |
| 5,923,830 A * | 7/1999 | Fuchs et al. | 714/11 |
| 5,923,859 A | 7/1999 | Melo et al. | |
| 5,954,809 A | 9/1999 | Riley et al. | |
| 5,970,234 A | 10/1999 | Jin | |
| 5,978,872 A | 11/1999 | Porterfield et al. | |
| 5,991,843 A | 11/1999 | Porterfield et al. | |
| 5,991,900 A * | 11/1999 | Garnett | 714/56 |
| 6,003,064 A * | 12/1999 | Wicki et al. | 709/200 |
| 6,038,630 A * | 3/2000 | Foster et al. | 710/317 |
| 6,052,341 A * | 4/2000 | Bingham et al. | 711/112 |
| 6,061,601 A * | 5/2000 | Jansen et al. | 700/7 |
| 6,092,134 A | 7/2000 | Chun et al. | |
| 6,128,691 A | 10/2000 | Haren et al. | |
| 6,134,625 A | 10/2000 | Abramson | |
| 6,138,247 A | 10/2000 | McKay et al. | |
| 6,141,770 A * | 10/2000 | Fuchs et al. | 714/11 |
| 6,219,627 B1 * | 4/2001 | Bonneau et al. | 703/1 |
| 6,226,261 B1 * | 5/2001 | Hurtta et al. | 370/219 |
| 6,247,100 B1 * | 6/2001 | Drehmel et al. | 711/141 |
| 6,370,605 B1 * | 4/2002 | Chong, Jr. | 710/33 |
| 6,378,021 B1 * | 4/2002 | Okazawa et al. | 710/317 |
| 6,378,029 B1 * | 4/2002 | Venkitakrishnan et al. | 710/317 |
| 6,493,786 B2 * | 12/2002 | Kikinis | 710/317 |
| 6,587,961 B1 * | 7/2003 | Garnett et al. | 714/11 |
| 6,597,692 B1 * | 7/2003 | Venkitakrishnan | 370/380 |
| 6,633,945 B1 * | 10/2003 | Fu et al. | 710/316 |
| 6,643,795 B1 * | 11/2003 | Sicola et al. | 714/6 |
| 6,667,955 B1 * | 12/2003 | Blanc et al. | 370/220 |
| 6,678,784 B2 * | 1/2004 | Marmash | 710/316 |
| 6,701,407 B1 * | 3/2004 | Honjo et al. | 710/317 |
| 6,715,023 B1 * | 3/2004 | Abu-Lebdeh et al. | 710/317 |
| 6,757,777 B1 * | 6/2004 | Griessbach et al. | 710/316 |
| 2002/0083261 A1 * | 6/2002 | Vasquez et al. | 710/317 |
| 2002/0095549 A1 * | 7/2002 | Matsunami et al. | 711/114 |
| 2003/0191879 A1 * | 10/2003 | Marmash | 710/113 |

* cited by examiner

HYBRID SWITCHING ARCHITECTURE

BACKGROUND OF THE INVENTION

The present invention relates to backup hardware in electronic computer systems, and, in particular, to backup hardware employing active single board computers (SBC's). Even more particularly, the present invention relates to a hybrid switching architecture for providing active-active single board computers backup in an electronic computer system.

During the past decade, the personal computer industry has literally exploded into the culture and business of many industrialized nations. Personal computers, while first designed for applications of limited scope involving individuals sitting at terminals, producing work products such as documents, databases, and spread sheets, have matured into highly sophisticated and complicated tools. What was once a business machine reserved for home and office applications, has now found numerous deployments in complicated industrial control systems, communications, data gathering, and other industrial and scientific venues. As the power of personal computers has increased by orders of magnitude every year since the introduction of the personal computer, personal computers have been found performing tasks once reserved to mini-computers, mainframes and even supercomputers.

In many of these applications, PC hardware and industry-standard software perform mission critical tasks involving significant stakes and low tolerance for failure. In these environments, even a single short-lived failure of a PC component can represent a significant financial event for its owner.

Standard off-the-shelf computers and operating systems are used in critical applications that require much higher levels of reliability than provided by most personal computers. They are used for communications applications, such as controlling a company's voice mail or e-mail systems. They may be used to control critical machines, such as check sorting, or mail sorting for the U.S. Postal Service. They are used for complicated industrial control, automaton, data gathering and other industrial and scientific applications. Computer failures in these applications can result in significant loss of revenue or loss of critical information. For this reason, companies seek to purchase computer equipment, specifically looking for features that increase reliability, such as better cooling, redundant, hot-swapable power supplies or redundant disk arrays. These features have provided relief for some failures, but these systems are still vulnerable to failures of the single board computer (SBC) within the personal computer system itself. If the processor, memory or support circuitry on a single board computer fails, or software fails, the single board computer can be caused to hang up or behave in such a way that the entire computer system fails. Some industry standards heretofore dictated that the solution to this problem is to maintain two completely separate personal computer systems, including redundant single board computers and interface cards. In many cases, these interface cards are very expensive, perhaps as much as ten times the cost of the single board computer.

As a result, various mechanisms for creating redundancy within and between computers have been attempted in an effort to provide backup hardware that can take over in the event of a failure.

In a typical computer system a common-bus architecture connects all components, which may include one or several central processing units (CPUs), random access memory (RAM), read-only memory (ROM), input/output (I/O) devices, disk drive controllers, direct memory access controllers (DMAC), secondary bus controllers such as a small computer systems interface (SCSI) or bus bridges to other buses such as a peripheral component interconnect (PCI), compact PCI, or an industry standard architecture (ISA) bus. Those components may all be disposed on a single plug-in board, or they may be implemented on a plug-in board as well as a motherboard. In the later case, the plug-in board(s) and the motherboard communicate via a bus. In some cases, data is shared by multiple CPUs using multiple port memories or data must be accessed by various components, one component at a time, or transferred from one component to another on a common bus.

The present invention advantageously addresses the above and other needs.

SUMMARY OF THE INVENTION

The present invention advantageously addresses the needs above as well as other needs by providing a hybrid switching architecture for providing connectivity among active switching single board computers in an electronic computer system.

In accordance with one embodiment, the present invention can be characterized as a system employing a first processor including a first processor data channel; a first hybrid switching module including a first hybrid switching module processor data channel, a first hybrid switching module main data channel, a first input/output link data channel, and a first switch, the first hybrid switching module processor data channel being coupled to the first processor data channel; a first main bus coupled to the first hybrid switching module main data channel; a second processor including a second processor data channel; and a second hybrid switching module including a second hybrid switching module processor data channel, a second input/output link data channel, and a second switch, the second hybrid switching module processor data channel being coupled to the second processor data channel, the second input/output link data channel being coupled to the first input/output link data channel.

In accordance with another embodiment, the present invention can be characterized as a hybrid switching module having a hybrid switching module processor data channel; a hybrid switching module main data channel; an input/output link data channel; a switch coupled to the hybrid switching module processor data channel; and a bridge coupled to the hybrid switching module main data channel; wherein the switch is selectively coupled to the bridge and selectively coupled to the input/output link data channel, wherein the hybrid switching module processor data channel is thereby selectively coupled to the bridge and selectively coupled to the input/output link data channel.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE PREFERRED EMBODIMENTS

The following description of the presently contemplated best mode of practicing the invention is not to be taken in a limiting sense, but is made merely for the purpose of describing the general principles of the invention. The scope of the invention should be determined with reference to the claims.

Figure 1:
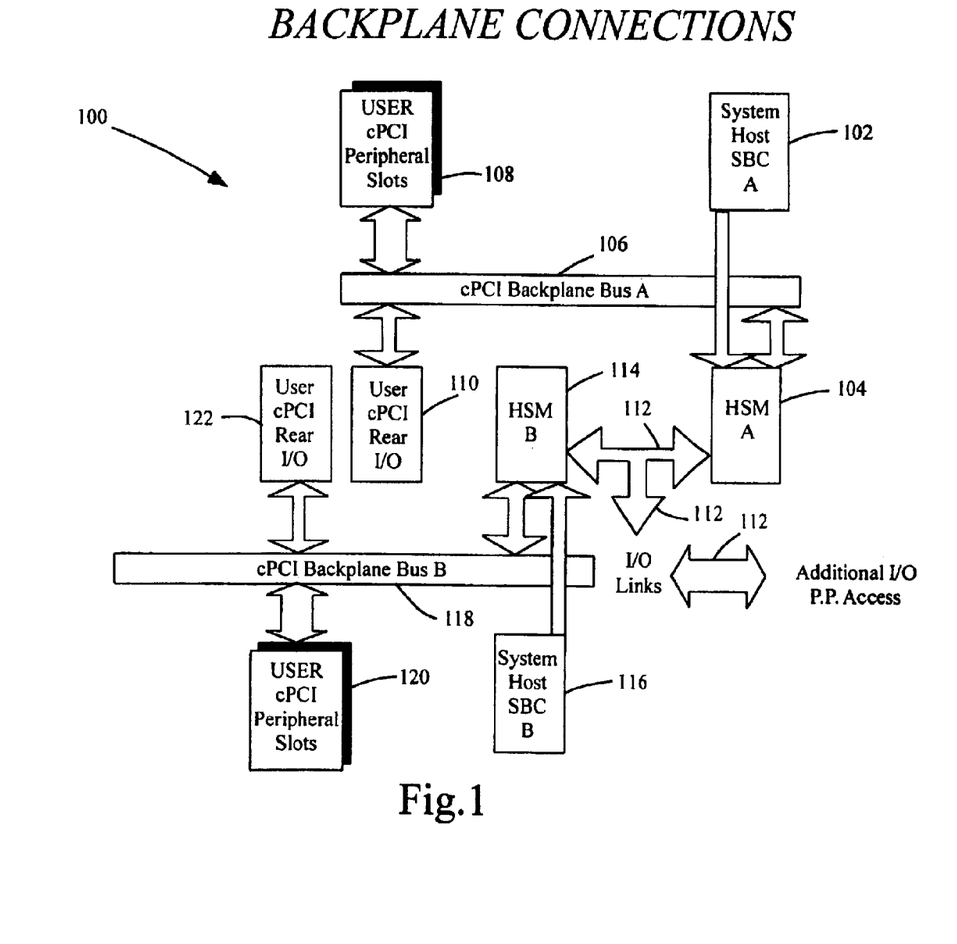
FIG. 1 is a block diagram illustrating a hybrid switching architecture implemented in a computer system of one embodiment of the present invention.

Referring first to FIG. 1, a block diagram is shown illustrating a hybrid switching architecture implemented in a computer system 100, an embodiment of the present invention. Shown is a first single board computer (SBC) 102 coupled through a hybrid switching module (HSM) 104 to a PCI or CPCI backplane bus 106. Coupled to the PCI or CPCI backplane bus 106 are a plurality of PCI or CPCI peripheral slots 108, into which PCI or CPCI peripheral cards can be inserted, and user CPCI rear input/output devices 110. Also coupled to the hybrid switching module 104 is an I/O link 112, which couples to a second hybrid switching module 114. The second hybrid switching module is connected to a second single board computer (SBC) 116, and also to a second PCI or CPCI backplane bus 118. Coupled to the second PCI or CPCI backplane bus 118 are a second plurality of PCI or CPCI peripheral slots 120, into which PCI peripheral cards (not shown) can be inserted, and second user CPCI rear input/output devices 122.

In practice, the hybrid switching module 104 (the first hybrid switching module 104) and the second hybrid switching module 114 manage a flow of data between the single board computer 102 (first single board computer 102) and the second single board computer 116, respectively. The single board computer (first single board computer 102) and the second single board computer 116 have no control, at least directly, over their respective abilities to access their respective PCI or CPCI backplane buses 106, 118. Through the I/O link 112, the first single board computer 102 and the second single board computer 116 can be coupled through the first hybrid switching module 104 and the second hybrid switching module 114, to any other hybrid switching module within the computer system 100 and in turn coupled to any other PCI or CPCI backplane bus in the computer system 100.

Arbitration/switching is handled in the crossbar switch inside the hybrid switching module (HSM) and is controlled by middleware (e.g., cluster software, such as is widely available) executed by the single board computer that directs the hybrid switching module via the crossbar switch. The bridge 410 (FIG. 4) translates signals from the single board computer into signals on the PCI or CPCI bus.

Figure 5:
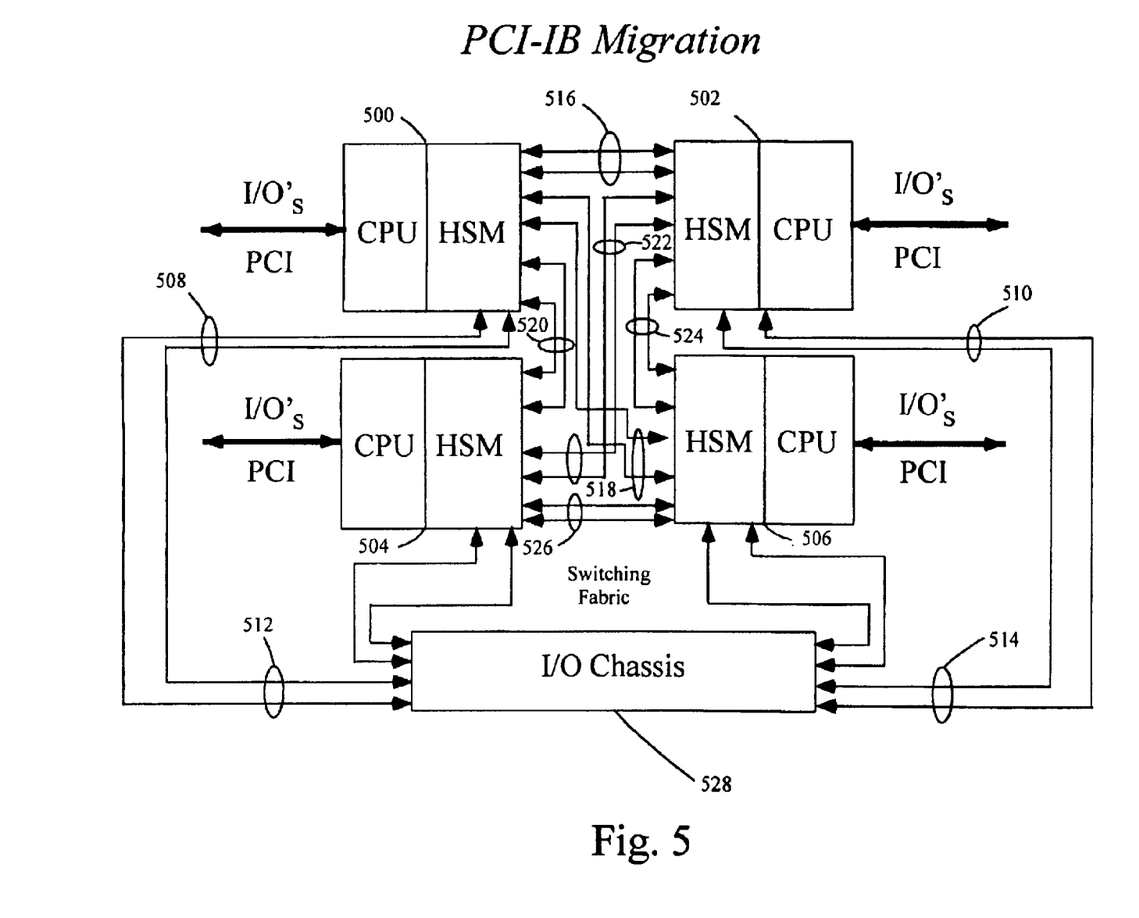
FIG. 5 is an illustration of a plurality of system hosts/hybrid switching module pairs, such as employ the hybrid switching module of FIG. 4, each coupled internally through a bridge to their respective PCI back plane busses, and each through an appropriate input/output link to each other hybrid switching module/system host pair.

As a result, all of the PCI peripheral slots 108,120, and the user rear PCI input/output devices 110, 122 are selectively available to each of the single board computers 102, 116. As a result, the single board computers 102, 116 may both operate together in order to perform multiprocessor functions, or one of the single board computers 102, 116 may serve as a backup to the other of the single board computers 102, 116, while not requiring full redundancy of the PCI peripheral cards in the PCI peripheral slots 108, 120 or the user PCI input/output devices 110, 122. This multi-computing backup can be extended to multiple single board computers, e.g., up to 8 single board computers, inter or intra box connectivity as shown in FIG. 5.

Because each of the single board computers 102, 116 is able to connect to each of the PCI Peripheral slots 108, 120 and each of the user PCI input/output devices 110, 122 a tremendous amount of functionality is available to the user of the computer system. For example, in art eight-away multi-computing configuration, eight-way point-to-point connectivity and redundancy is enabled by the present embodiment. The same connectivity can be applied directly as I/O chassis connectivity as the industry migrates into point-to-point architecture.

As shown by way of illustration, two single board computers, two hybrid switching modules, two PCI backplane busses, two sets of PCI peripheral slots and two sets of user PCI input/output devices are employed in the present embodiment. However, as will be appreciated by a person of ordinary skill in the art, the teachings at the present embodiment can be expanded to any member N of such components, wherein the I/O link 112 links all of the hybrid switching modules together, and allows each of N single board computers to communicate with each of N PCI backplane buses and each of the other single board computers via respective pairs of hybrid switching modules.

In this way an unlimited degree of redundancy (N times redundancy) can be achieved using the hybrid switching module of the present embodiment.

Figure 2:
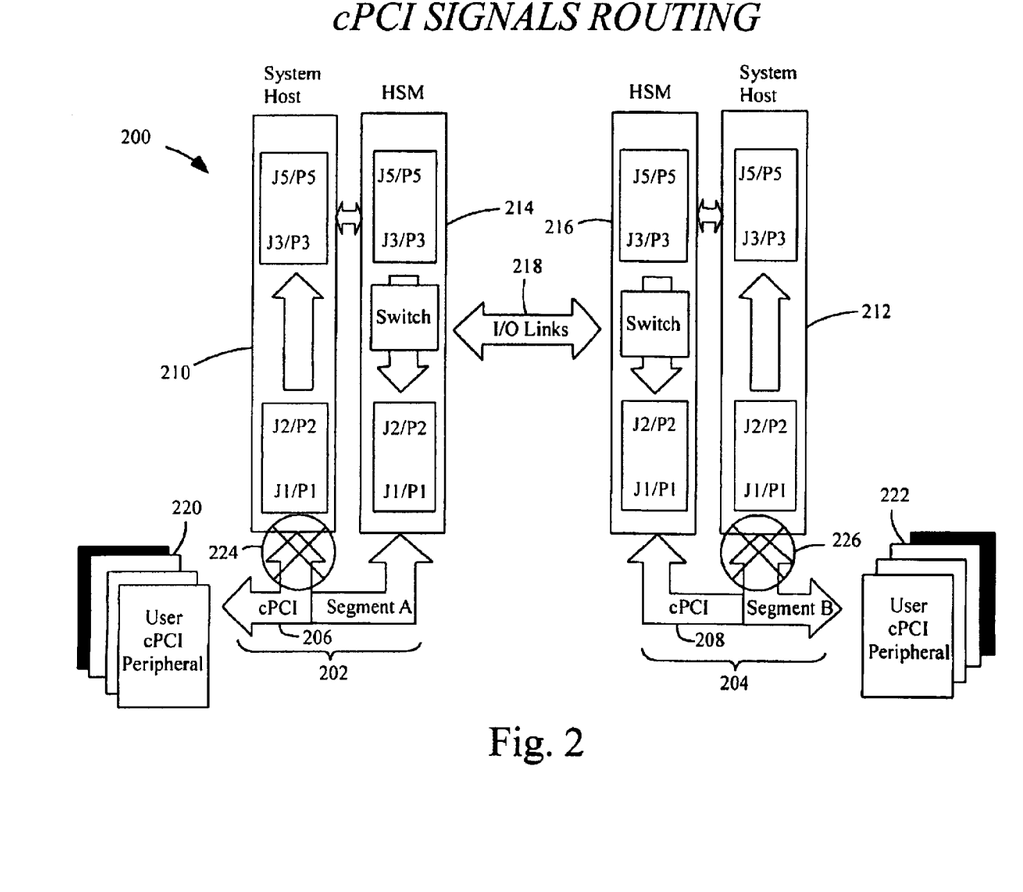
FIG. 2 is a schematic block diagram illustrating the computer system such as in FIG. 1 including a modification of single board computer (system host) connections to PCI or CPCI backplane buses by rerouting signals from single board computers through respective hybrid switching modules.

Referring next to FIG. 2, shown is a schematic block diagram illustrating the computer system including a modification of single board computer (system host) connections to PCI or CPCI backplane buses 206, 208 by rerouting signals from single board computers through respective hybrid switching modules 214, 216.

Shown is a single board computer 210 coupled to a first hybrid switching module 214, and a second single board computer 212 coupled to a second hybrid switching module 216. The first hybrid switching module 214 and the second hybrid switching module 216 are coupled together through an I/O link 218 and are each coupled to respective PCI backplane buses 206, 208. The respective PCI backplane buses 206, 208 are coupled respectively to PCI peripheral slots and user PCI or CPCI input/output devices 220, 222.

As shown in FIG. 2, a connection 224 between the first PCI backplane bus 206 and the first single board computer 210 is deleted, i.e., the central resources for the single board computer (the first single board computer 210) are disabled, so as to require that any access, i.e., communication/data transfer, between the first PCI backplane bus 206 and the first single board computer 210 be redirected through the first hybrid switching module 214. Similarly, a connection 226 between the second PCI backplane bus and the second single board computer 212 is deleted, i.e., eliminated, so as to require that any access, i.e., communication/data transfer, between the second PCI backplane bus 208 and the second single board computer 212 be redirected through the second hybrid switching module 218. Furthermore, the first hybrid switching module 214 and the second hybrid switching module 216 are coupled to each other through the I/O link 218.

This can be expanded to N connections through the I/O link 218 with arbitration being handled in the crossbar switch in each hybrid switching module, managed and controlled by the middleware.

Figure 3:
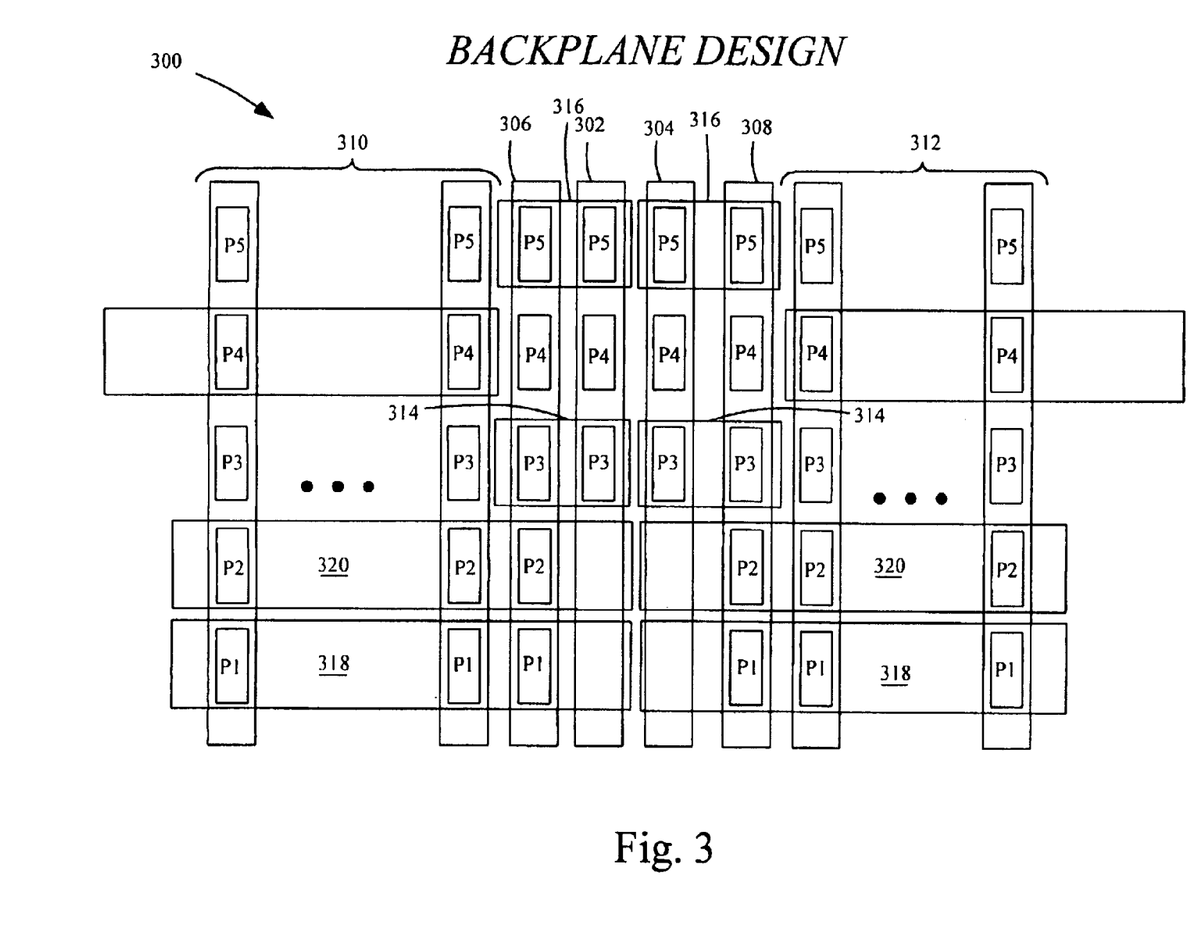
FIG. 3 is a conceptual representation of bus connections between components of a computer system such as in FIG. 2.

Referring next to FIG. 3, illustrated is a conceptual representation of bus connections between components of a computer system 300 in accordance with the present embodiment.

As illustrated, a first single board computer 302 and a second single board computer 304 are coupled through bus connectors P3 and P5 314, 316 to a first hybrid switching module 306 and a second hybrid switching module 308, respectively. The hybrid switching modules in turn carry data from the bus connections P3 and P5 314, 316 to bus connections P1 and P2 318, 320, the standard bus connections from PCI backplane buses to single board computers. The hybrid switching modules 306, 308 carry the data from the single board computers 302, 304 to respective PCI backplane buses, which carry the data to respective PCI peripheral slots and user PCI input/output devices 310, 312.

Figure 4:
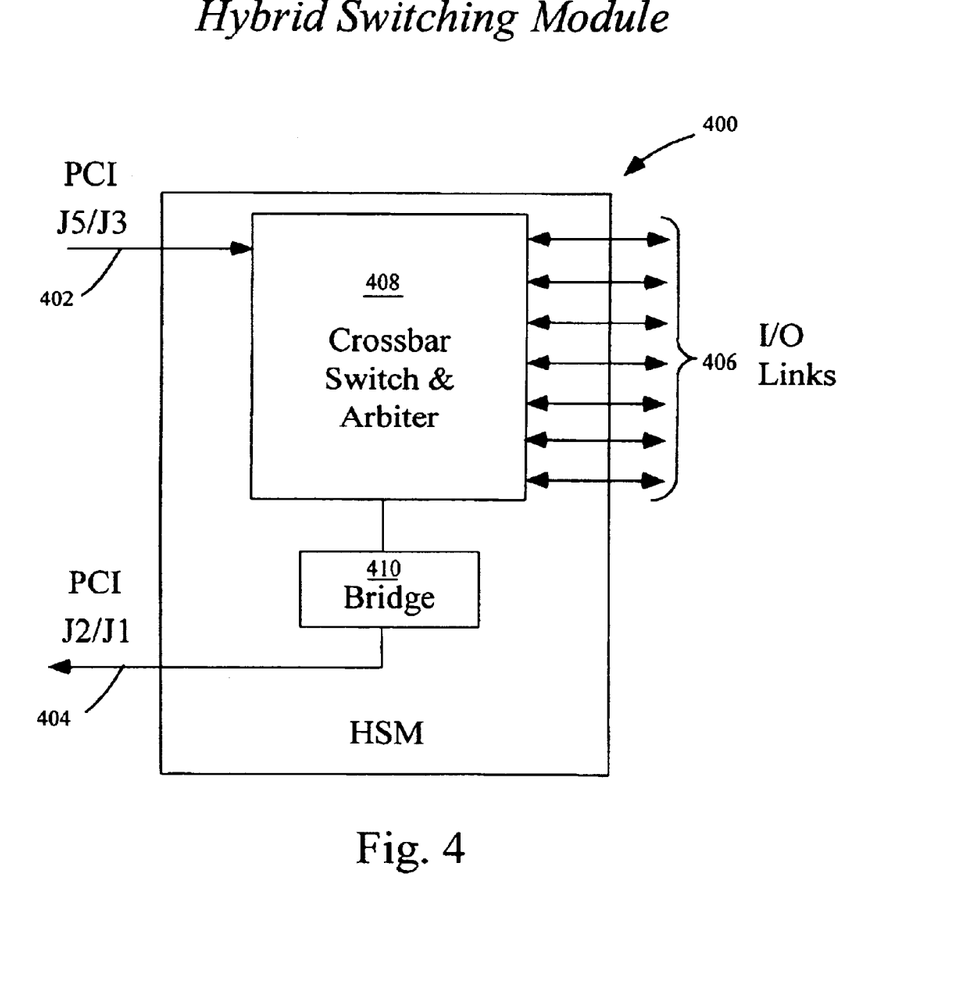
FIG. 4 is an illustration of a hybrid switching module such as illustrated in the computer system of FIG. 2 comprising an input PCI or CPCI bus connection, an output PCI or CPCI bus connection, input/output links, and a crossbar switch and arbiter and a bridge.

Referring next to FIG. 4, illustrated is a hybrid switching module 400 comprising a PCI CPU bus connection 402, a PCI main bus connection 404, input/output links 406, and a crossbar switch and arbiter 408 (such as for example INTEL Part No. 82808) and a bridge 410 (such as for example INTEL Part. No. 21554). (Alternatively, the hybrid switching module may be implemented as a single integrated device, such as a single chip integrated circuit, or a multichip module.)

Data received through the PCI backplane bus 202 (FIG. 2), 204 (FIG. 2) is received in the PCI main bus connection 404 and directed to the bridge 410. The bridge 410 directs the data from the PCI main bus connection 404 to the crossbar switch and arbiter 408, and performs other bridge functions, such as are well understood by the person of ordinary skill in the art.

The PCI CPU bus connection 402 is coupled directly to the respective single board computer 210 (FIG. 2), 212 (FIG. 2).

The PCI main bus connection 404 is coupled to the respective PCI backplane bus 202 (FIG. 2), 204 (FIG. 2).

In operation, the crossbar switch and arbiter 408 controls data flow between the PCI CPU bus connection 402 and the input/output link 406, and between the PCI CPU bus connection 402 and the PCI main bus connection 404. The data flow is controlled by software depending on the mode of operation. In the case of CPU failure, for example, a failover operation will take place, the next available CPU will take over and be coupled to the PCI backplane busses through the hybrid switching modules. Thus, a means of data flow is provided between both the single board computer 210 (FIG. 2), 212 (FIG. 2), and each respective PCI backplane bus 202 (FIG. 2), 204 (FIG. 2) and each other single board computer 210 (FIG. 2), 212 (FIG.2) and each PCI backplane bus 202 (FIG. 2) (via the I/O link 406).

Referring next to FIG. 5, illustrated is a plurality of single board computer/hybrid switching module pairs 500, 502, 504, 506, each coupled internally through a bridge to their respective PCI backplane buses 508, 510, 512, 514 and each through an appropriate input/output link 516, 518, 520, 522, 524, 526 to each other single board computer/hybrid switching module pair 500, 502, 504, 506. As shown, all of the PCI backplane buses 508, 510, 512, 514 may be part of an I/O chassis 528 that houses all of the point-to-point linkages (PCI backplane busses) 508, 510, 512, and 514. Each single board computer/hybrid switching module pair 500, 502, 504, 506 can be coupled to each of the illustrated point-to-point linkages 508, 510, 512, 514, either directly, through its own hybrid switching module and internal bridge or indirectly through one of the input/output links 516, 518, 520, 522, 524, 526 to one of the other hybrid switching modules and through the other hybrid switching module's internal bridge forming a high speed switching fabric.

Functioning of the hybrid switching modules 400 (FIG. 4) and in particular the operation of the crossbar switch and arbiter 408 (FIG. 4), in order to direct data from the respective single board computers to the appropriate PCI backplane bus or other single board computer may be programmatically controlled, by, for example, the single board computers or may operate as a result, for example, of heartbeats that detect failure of various components within the industrial computer system switch out single board computers in the event failure in the single board computer is detected.

Advantageously, in the event of the failure of a single board computer, reduction in performance need only be reduced by, for example, 25 percent (in the event there are four single board computer/hybrid switching module pairs) as the hybrid switching modules can be reconfigured in order to utilize, for example, the remaining three single board computers.

While the invention herein disclosed has been described by means of specific embodiments and applications thereof, numerous modifications and variations could be made thereto by those skilled in the art without departing from the scope of the invention set forth in the claims.

By way of example, The HSM can be implemented as a rear I/O module and bridges to active central resources or it can be implemented as a companion board attached to the single board computer and bridges to active central resources.

What is claimed is:

1. A system comprising:
a first processor including a first processor data channel;
a first hybrid switching module including a first hybrid switching module processor data channel, a first hybrid switching module main data channel, a first input/output link data channel, a first crossbar switch and arbiter, and a first bridge, the first hybrid switching module processor data channel being coupled to the first processor data channel;
a first main bus coupled to the first hybrid switching module main data channel allowing the first processor to access a first peripheral device coupled with the first main bus to implement a first function;
a second processor including a second processor data channel;
a second hybrid switching module including a second hybrid switching module processor data channel, a second hybrid switching module main data channel, a second input/output link data channel, a second crossbar switch and arbiter, and a second bridge, the second hybrid switching module processor data channel being coupled to the second processor data channel, the second input/output link data channel being coupled to the first input/output link data channel; and a second main bus coupled to the second hybrid switching module main data channel allowing the second processor to access a second peripheral device coupled with the second main bus to implement a second function that is not redundant to the first function;

wherein the first hybrid switching module further comprises a failure mode that couples the first input/output link data channel with the first main bus when the first processor fails allowing the second processor to access the first peripheral device on the first main bus to implement the first function, and the second hybrid switching module further comprises a failure mode that couples the second input/output link data channel with the second main bus when the second processor fails allowing the first processor to access the second peripheral device on the second main bus to implement the second non-redundant function.

2. The system of claim 1 further comprising:

a third processor including a third processor data channel; and a third hybrid switching module including a third hybrid switching module processor data channel, third input/output link data channel, a fourth input/output link data channel, and a third switch, the third hybrid switching module processor data channel being coupled to the third processor data channel;

wherein said first hybrid switching module further comprises a fifth input/output link data channel;

wherein the third input/output link data channel is coupled to the fifth input/output link data channel;

wherein said second hybrid switching module further comprises a sixth input/output link data channel;

wherein the fourth input/output link data channel is coupled to the sixth input/output link data channel.

3. The system of claim 2 wherein said third hybrid switching module further comprises a third hybrid switching module main data channel, wherein said system further comprises:

a third main bus coupled to the third hybrid switching module main data channel.

4. An apparatus comprising:

a first hybrid switching module comprising:
a first hybrid switching module processor data channel;
a first hybrid switching module main data channel;
an input/output link data channel;
a first switch coupled to the first hybrid switching module processor data channel; and
a first bridge coupled to the first hybrid switching module main data channel;

wherein the first switch selectively couples to the first bridge and selectively couples to the input/output link data channel, wherein the first hybrid switching module processor data channel is thereby selectively coupled to the first bridge allowing access over a first main bus to a first peripheral device that implements a first function, and selectively coupled to the input/output link data channel allowing access over a second main bus to a second peripheral device that implements a second function that is not redundant to the first function.

5. The apparatus of claim 4 further comprising a first processor coupled to the first hybrid switching module processor data channel.

6. The apparatus of claim 4, wherein the first main bus is coupled to the first bridge.

7. The apparatus of claim 4 further comprising a second switch coupled to the input/output link data channel.

8. The apparatus of claim 7 further comprising second bridge coupled to the second switch.

9. The apparatus of claim 8 further comprising:

the first main bus is coupled to the first bridge; and the second main bus is coupled to the second bridge.

10. The apparatus of claim 7 further comprising:

a first processor coupled to the first hybrid switching module processor data channel; and a second processor coupled to a second hybrid switching module processor data channel, the second switch being coupled to the second hybrid switching module processor data channel.

11. A system comprising:

a first hybrid switching module processor data channel;

a first hybrid switching module main data channel;

a first hybrid switching module bus data channel;

an input/output link data channel; and a first hybrid switching module coupled to the first hybrid switching module processor data channel and to the first hybrid switching module main data channel;

wherein the first hybrid switching module selectively couples to the first hybrid switching module bus data channel and selectively couples to the input/output link data channel, wherein the first hybrid switching module processor data channel is thereby selectively coupled to the first hybrid switching module bus data channel allowing access to a first peripheral device providing a first function, and selectively coupled to the input/output link data channel allowing access to a second peripheral device providing a second function that is not redundant of the first function, and the first hybrid switching module further comprises a failure mode that couples the input/output link data channel with the first hybrid switching module bus data channel during a failure allowing external access to the first peripheral device providing the first function during the failure.

12. The system of claim 11 further comprising a first processor coupled to the first hybrid switching module processor data channel.

13. The system of claim 11 further comprising a first main bus coupled to the first hybrid switching module bus data channel.

14. The system of claim 11 further comprising a second hybrid switching module coupled to the input/output link data channel.

15. The system of claim 14 further comprising:

a first main bus coupled to the first hybrid switching module; and a second main bus coupled to the second hybrid switching module.

16. The system of claim 14 further comprising:

a first processor coupled to the first hybrid switching module processor data channel; and a second processor coupled to a second hybrid switching module processor data channel, the second hybrid switching module being coupled to the second hybrid switching module processor data channel such that the second processor has access to the first function of the first peripheral device through the input/output link data channel at least during the failure.

* * * * *